US011870150B2

(12) United States Patent
Kim et al.

(10) Patent No.: US 11,870,150 B2
(45) Date of Patent: Jan. 9, 2024

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Young Ju Kim, Gyeonggi-do (KR); Dong Pil Park, Incheon (KR); Byung Jin Choi, Incheon (KR); Han Sub Ryu, Gyeongsangbuk-do (KR); Ho Dong Yoon, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 217 days.

(21) Appl. No.: 17/508,055

(22) Filed: Oct. 22, 2021

(65) Prior Publication Data

US 2022/0131279 A1 Apr. 28, 2022

(30) Foreign Application Priority Data

Oct. 23, 2020 (KR) ........................ 10-2020-0138106

(51) Int. Cl.
*H01Q 21/24* (2006.01)
*H01Q 1/38* (2006.01)
*H01Q 21/08* (2006.01)

(52) U.S. Cl.
CPC ............... *H01Q 21/24* (2013.01); *H01Q 1/38* (2013.01); *H01Q 21/08* (2013.01)

(58) Field of Classification Search
CPC .......... H01Q 21/24; H01Q 1/38; H01Q 21/08; H01Q 1/364; H01Q 21/28; H01Q 1/243; H01Q 1/22; H01Q 1/50; H01Q 21/0006; H01Q 21/30; H01Q 1/2283; G09F 9/30
See application file for complete search history.

(56) References Cited

U.S. PATENT DOCUMENTS

| | | | | |
|---|---|---|---|---|
| 2020/0412022 A1* | 12/2020 | Yun | ........................ | H01Q 21/22 |
| 2022/0276682 A1* | 9/2022 | Yu | .......................... | H01Q 9/045 |

FOREIGN PATENT DOCUMENTS

KR 10-2013-0095451 A 8/2013

* cited by examiner

*Primary Examiner* — David E Lotter
(74) *Attorney, Agent, or Firm* — The PL Law Group, PLLC

(57) ABSTRACT

An antenna package according to an exemplary embodiment of the present invention includes a first antenna device which includes a first antenna unit including a first radiator, a second antenna device which includes a second antenna unit including a second radiator whose polarization direction is perpendicular to the first radiator, a first circuit board electrically connected with the first antenna unit, a second circuit board electrically connected with the second antenna unit, and a third circuit board on which at least one antenna driving integrated circuit (IC) chip electrically and independently connected to the first circuit board and the second circuit board is mounted. By supplying power to two antenna devices having different polarization directions, respectively, signal interference and signal loss may be prevented, and dual polarization may be implemented.

15 Claims, 6 Drawing Sheets

ANTENNA PACKAGE AND IMAGE DISPLAY DEVICE INCLUDING THE SAME

CROSS-REFERENCE TO RELATED APPLICATION(S) AND CLAIM OF PRIORITY

This application claims the benefit under 35 USC § 119(a) of Korean Patent Application No. 10-2020-0138106, filed on Oct. 23, 2020, in the Korean Intellectual Property Office, the entire disclosure of which is incorporated herein by reference for all purposes.

BACKGROUND

1. Field of the Invention

The present invention relates to an antenna package and an image display device including the same, and more specifically, to an antenna package including an antenna device and a relay structure, and an image display device including the same.

2. Description of the Related Art

Recently, according to development of the information-oriented society, wireless communication techniques such as Wi-Fi, Bluetooth, and the like are implemented, for example, in a form of smartphones by combining with image display devices. In this case, an antenna may be coupled to the image display device to perform a communication function.

Recently, with mobile communication techniques becoming more advanced, it is necessary for an antenna for performing communication in a high frequency or ultra-high frequency band corresponding to, for example, 3G, 4G or 5G to be coupled to the image display device.

However, when a driving frequency of the antenna is increased, signal interference and signal loss may be increased in a high frequency or ultra-high frequency band. In particular, when transmitting/receiving two polarized waves at the same time, signal efficiency may be further reduced.

Accordingly, there is a need to design an antenna package that can prevent signal interference and signal loss while implementing high frequency or ultra-high frequency radiation characteristics through the antenna device.

For example, Korean Patent Laid-Open Publication No. 2013-0095451 discloses an antenna integrally formed with a display panel, but does not consider a structure to increase signal efficiency in a high frequency or ultra-high frequency band as described above.

SUMMARY

An object of the present invention is to provide an antenna package having improved radiation characteristics and signal efficiency.

Another object of the present invention is to provide an image display device including the antenna package having improved radiation characteristics and signal efficiency.

To achieve the above objects, the following technical solutions are adopted in the present invention.

1. An antenna package including: a first antenna device including a first antenna unit including a first radiator; a second antenna device including a second antenna unit including a second radiator having a polarization direction perpendicular to the first radiator; a first circuit board electrically connected with the first antenna unit; a second circuit board electrically connected with the second antenna unit; and a third circuit board on which at least one antenna driving integrated circuit (IC) chip electrically and independently connected to the first circuit board and the second circuit board is mounted.

2. The antenna package according to the above 1, wherein the first antenna device and the second antenna device are located at the same level.
3. The antenna package according to the above 2, wherein the first antenna unit includes a plurality of the first antenna units arranged in a column direction, and the second antenna unit includes a plurality of the second antenna units arranged in a row direction perpendicular to the column direction in a planar direction.
4. The antenna package according to the above 3, wherein one antenna driving IC chip is disposed on the third circuit board.
5. The antenna package according to the above 4, wherein the third circuit board includes a first connection wiring electrically connecting the first antenna unit and the antenna driving IC chip, and a second connection wiring electrically connecting the second antenna unit and the antenna driving IC chip.
6. The antenna package according to the above 5, wherein the first connection wiring and the second connection wiring extend in a direction perpendicular to each other in a planar direction.
7. The antenna package according to the above 4, further including: a first connector disposed on the first circuit board to be electrically connected with the first antenna unit; and a second connector disposed on the second circuit board to be electrically connected with the second antenna unit.
8. The antenna package according to the above 7, further including: a third connector disposed on the third circuit board and coupled to the first connector to electrically connect the first antenna unit and the antenna driving IC chip to each other; and a fourth connector disposed on the third circuit board and coupled to the second connector to electrically connect the second antenna unit and the antenna driving IC chip to each other.
9. The antenna package according to the above 1, wherein the first circuit board and the second circuit board are a flexible printed circuit board (FPCB), respectively, and the third circuit board is a rigid printed circuit board.
10. The antenna package according to the above 1, wherein the first antenna unit and the second antenna unit are independently and separately disposed on one antenna dielectric layer.
11. The antenna package according to the above 10, wherein the first circuit board and the second circuit board are integrally formed with the antenna dielectric layer.
12. The antenna package according to the above 1, further including a circuit element or a control element mounted on the third circuit board.
13. An image display device including: a display panel; and the above-described antenna package coupled to the display panel.
14. The image display device according to the above 13, wherein the first antenna unit and the second antenna unit are independently and separately disposed on a top surface of the display panel.

15. The image display device according to the above 14, wherein the first antenna unit and the second antenna unit are disposed adjacent to each other with one of corner portions of the top surface of the display panel interposed between the first antenna unit and the second antenna unit.
16. The image display device according to the above 15, wherein the first antenna unit is disposed along a lengthwise edge of the display panel adjacent to the corner portion, and the second antenna unit is disposed along a widthwise edge of the display panel adjacent to the corner portion.
17. The image display device according to the above 13, wherein the third circuit board is disposed below the display panel, and the first circuit board and the second circuit board each extend by bending from the top surface of the display panel along a side surface and a bottom surface of the display panel to be electrically connected with the third circuit board.

According to embodiments of the present invention, the first antenna unit included in the first antenna device and the second antenna unit included in the second antenna device may be disposed to have polarization directions perpendicular to each other. Therefore, it is possible to implement dual polarization while preventing signal interference and signal loss, and reduce a fading phenomenon in which signal amplitude and phase of the antenna unit are irregularly fluctuated. In addition, as the plurality of antenna devices are disposed with being spatially separated, for example, it is possible to select a resonance frequency of a band having less signal interference, or synthesize and transmit/receive a plurality of resonance frequencies.

According to exemplary embodiments, the first antenna device and the second antenna device may be electrically connected to the third circuit board on which the antenna driving integrated circuit chip is mounted through the first circuit board and the second circuit board, respectively. In addition, according to some embodiments, the first circuit board and the second circuit board may be electrically and independently connected to the third circuit board through the connectors. Thereby, it is possible to omit a bonding process and an adhering process, and easily implement a stable circuit board connection.

The antenna package may be applied to a display device including a mobile communication device capable of transmitting and receiving signals in a high frequency or ultra-high frequency band of 3G, 4G, 5G or higher, thereby improving optical characteristics such as radiation characteristics and transmittance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
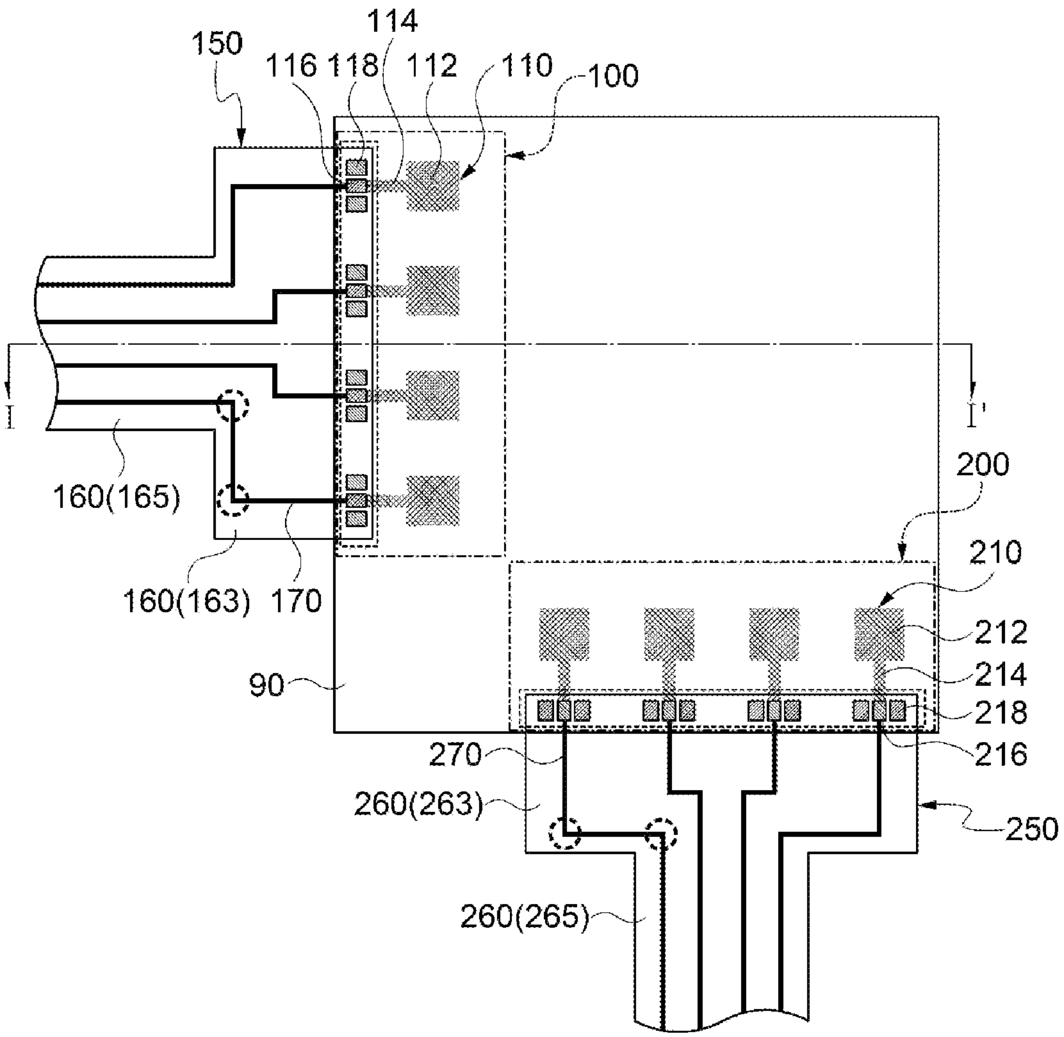
FIGS. 1 and 2 are schematic plan views of an antenna package according to exemplary embodiments.

Embodiments of the present invention provide an antenna package which includes a circuit board including a plurality of antenna devices and an antenna driving integrated circuit (IC) chip to which the antenna devices are electrically connected.

The antenna devices may be, for example, a microstrip patch antenna, a monopole antenna, or a dipole antenna, which are manufactured in the form of a transparent film. The antenna devices may be applied to a communication device for high frequency or ultra-high frequency (e.g., 3G, 4G, 5G or higher) communication, for example. However, in relation to an application of the antenna device, the use of the antenna device is not limited to the display device, and the antenna device may be applied to various structures such as a vehicle, a home appliance, a building, a glass window and the like.

Further, embodiments of the present invention provide an image display device including the antenna package.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

The terms “upper surface,” “side,” “bottom surface,” “front surface,” “rear surface,” and the like as used herein do not designate absolute positions, but are used to distinguish relative positions between components.

Figure 2:
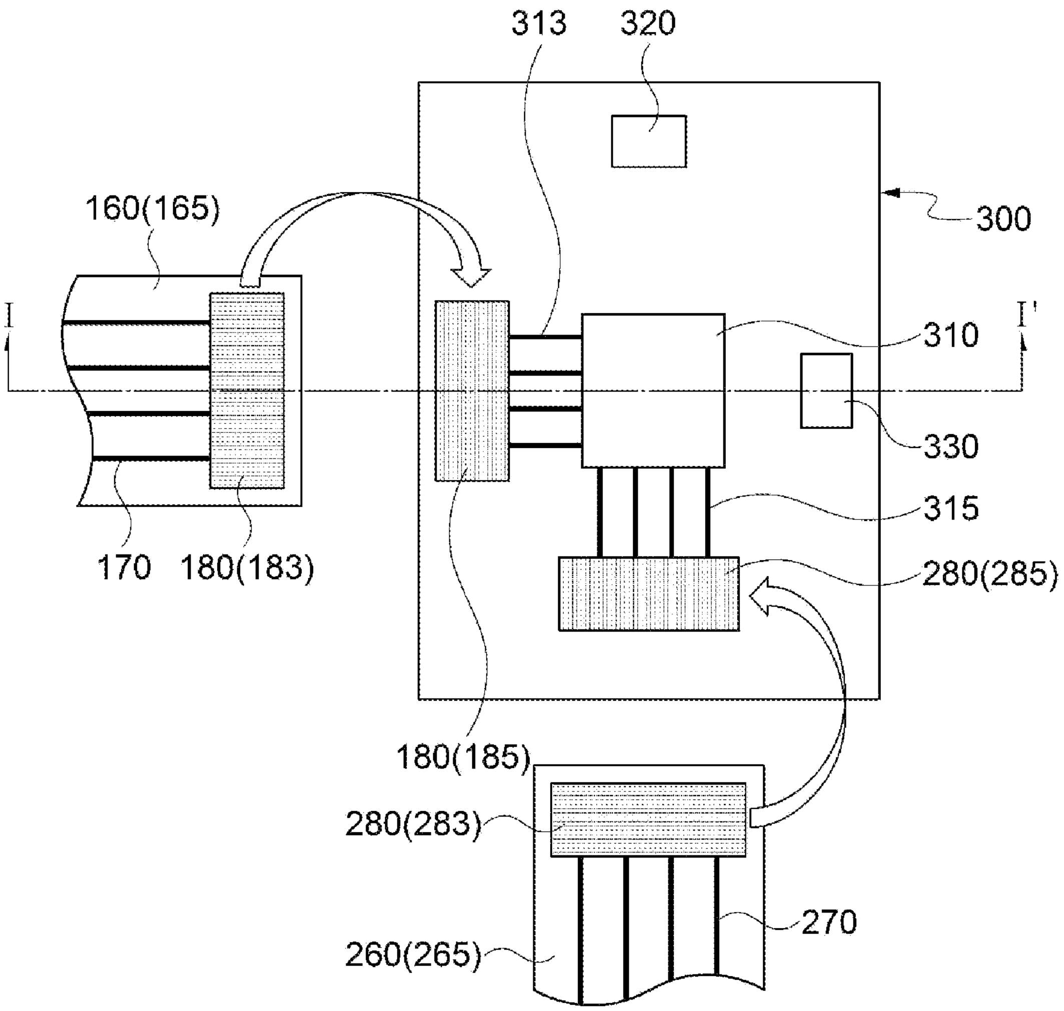

FIGS. 1 and 2 are schematic plan views of an antenna package according to exemplary embodiments.

Referring to FIGS. 1 and 2, the antenna package includes a first antenna device 100, a second antenna device 200, a first circuit board 150 electrically connected with the first antenna device 100, a second circuit board 250 electrically connected with the second antenna device 200, and a third circuit board 300 electrically and independently connected to the first circuit board 150 and the second circuit board 250.

In some embodiments, the first antenna device 100 and the second antenna device 200 may respectively include a first antenna unit 110 and a second antenna unit 210, which are disposed on an antenna dielectric layer 90.

The antenna dielectric layer 90 may include an insulation material having a predetermined dielectric constant. For example, the antenna dielectric layer 90 may include a foldable transparent resin material having flexibility.

For example, the antenna dielectric layer 90 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin, a silicone resin and the like. These may be used alone or in combination of two or more thereof.

In some embodiments, the antenna dielectric layer 90 may include an adhesive material such as an optically clear adhesive (OCA), an optically clear resin (OCR) and the like.

In some embodiments, the antenna dielectric layer 90 may include an inorganic insulation material such as glass, silicon oxide, silicon nitride, silicon oxynitride or the like.

In some embodiments, the antenna dielectric layer 90 may have a dielectric constant adjusted in a range of about 1.5 to 12. When the dielectric constant exceeds about 12, signal loss of transmission lines 114 and 214 is excessively increased, such that signal sensitivity and signal efficiency during high frequency band communication may be decreased.

In some embodiments, the first antenna unit 110 and the second antenna unit 210 may be independently disposed on a top surface of one antenna dielectric layer 90 with being separated from each other. In this case, for example, it is possible to prevent an occurrence of a step between portions in which the antenna units 110 and 210 are located and other portions on an image display device to be described below. Accordingly, for example, display properties of the image display device may be stably and uniformly implemented.

For example, a plurality of first antenna units 110 may be arranged in a form of an array along a column direction of the first antenna device 100 to form a first antenna unit 110 column.

For example, a plurality of second antenna units 210 may be arranged in a form of an array along a row direction perpendicular to the column direction to form a second antenna unit 210 row.

In some embodiments, the first antenna unit 110 column and the second antenna unit 210 row may be partially overlapped with or spaced apart from each other in the column direction on the antenna dielectric layer 90.

For example, among the second antenna units 210 of the second antenna unit 210 row, the second antenna unit 210 closest to the first antenna unit 110 column may be disposed while being partially or entirely overlapped with the first antenna units 110 of the first antenna unit 110 column in the column direction on the antenna dielectric layer 90. In this case, arrangement efficiency of the antenna units 110 and 210 may be increased, such that a volume of the antenna package may be reduced. Accordingly, space efficiency of the image display device may be increased by reducing a region occupied by the antenna package in the image display device to be described below.

For example, among the second antenna units 210 in the second antenna unit 210 row, the second antenna unit 210 closest to the first antenna unit 110 column may be disposed with being spaced apart from each other in the row direction at a predetermined distance while not being overlapped with the first antenna units 110 of the first antenna unit 110 column in the column direction on the antenna dielectric layer 90. In this case, signal interference and disturbance between the antenna units 110 and 210 may be reduced. Accordingly, antenna gains of the antenna units 110 and 210 may be improved.

The first antenna unit 110 of the first antenna device 100 may include a first radiator 112 and a first transmission line 114. The second antenna unit 210 of the second antenna device 200 may include a second radiator 212 and a second transmission line 214. The radiators 112 and 212 may have, for example, a polygonal plate shape, and the first transmission line 114 and the second transmission line 214 may extend from one side of the first radiator 112 and the second radiator 212, respectively. The transmission lines 114 and 214 may be integrally formed with the radiators 112 and 212 as a substantial single member.

According to exemplary embodiments, the radiators 112 and 212 may provide signal transmission/reception in a high frequency or ultra-high frequency (e.g., 3G, 4G, 5G or higher) band. As a non-limiting example, resonance frequencies of the antenna units 110 and 210 may be about 24 to 29.5 GHz, and/or about 37 to 45 GHz.

In exemplary embodiments, the second antenna device 200 may be located at the same level as the first antenna device 100, and the second antenna unit 210 may have a polarization direction perpendicular to the polarization direction of the first antenna unit 110.

For example, the first antenna unit 110 and the second antenna unit 210 may be disposed on the antenna dielectric layer 90 so that the polarization directions of the first radiator 112 and the second radiator 212 are perpendicular to each other. For example, one radiator of the radiators 112 and 212 may be vertically polarized, and the other radiator may be horizontally polarized.

For example, two antenna units 110 and 210 having polarization directions perpendicular to each other may be independently supplied with a power. Accordingly, it is possible to implement dual polarization while preventing signal interference and signal loss, and reduce a fading phenomenon in which the signal amplitude and phase of the antenna unit are irregularly fluctuated.

In addition, as the plurality of antenna devices are disposed with being spatially separated, for example, it is possible to select a resonance frequency of a band having less signal interference, or synthesize and transmit/receive a plurality of resonance frequencies.

In some embodiments, the first radiator 112 and the second radiator 212 may be formed to have the same area and shape. In this case, it is possible to implement dual polarization in which signal interference and signal loss are prevented by separating an arrangement space of the antenna units 110 and 210 having a same resonance frequency.

In some embodiments, the radiators 112 and 212 may control the resonance frequency capable of driving the antenna by adjusting an area of each of the radiators.

For example, the first antenna unit 110 of the first antenna device 100 and the second antenna unit 210 of the second antenna device 200 may be formed to have different areas and/or shapes, and thereby, may have different resonance frequencies. In this case, for example, two types of different signal transmission/reception may be implemented in one antenna package, and thereby, signal transmission/reception in high frequency or ultra-high frequency and wide band may be implemented with dual polarization.

The first antenna unit 110 and the second antenna unit 210 may further include a first signal pad 116 and a second signal pad 216, respectively. The first signal pad 116 and the second signal pad 216 may be connected with one end of each of the first transmission line 114 and the second transmission line 214.

In some embodiments, the first signal pad 116 and the second signal pad 216 may be provided as an integral member with the first transmission line 114 and the second transmission line 214, respectively, and distal ends of the first transmission line 114 and the second transmission line

214 may be provided as the first signal pad 116 and the second signal pad 216, respectively.

According to some embodiments, first ground pads 118 and second ground pads 218 may be disposed around the first signal pad 116 and the second signal pad 216, respectively. For example, a pair of first ground pads 118 may be disposed to face each other with the first signal pad 116 interposed therebetween. In addition, a pair of second ground pads 218 may be disposed to face each other with the second signal pad 216 interposed therebetween. The first ground pad 118 may be electrically and physically separated from the first transmission line 114 and the first signal pad 116. The second ground pad 218 may be electrically and physically separated from the second transmission line 214 and the second signal pad 216. Accordingly, noise generated when transmitting/receiving a radiation signal through the signal pads 116 and 216 may be efficiently filtered or reduced.

In this case, the first ground pad 118 and the second ground pad 218 may also be provided as ground layers for the first radiator 112 and the second radiator 212, respectively, and vertical radiation may be implemented through the radiators 112 and 212.

In some embodiments, a separate ground layer may be formed under the radiators 112 and 212, and a conductive member of the display device on which the antenna device is mounted may be provided as the ground layer for the radiators 112 and 212.

The conductive member may include, for example, a gate electrode of a thin film transistor (TFT) included in the display panel, various wirings such as scan lines or data lines, or various electrodes such as pixel electrodes, common electrodes and the like.

In one embodiment, for example, various structures including a conductive material disposed under the display panel may be provided as the ground layer. For example, a metal plate (such as a stainless steel (SUS) plate), a pressure sensor, a fingerprint sensor, an electromagnetic wave shielding layer, a heat radiation sheet, a digitizer, etc. may be provided as the ground layer.

The antenna units 110 and 210 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), tin (Sn), calcium (Ca), or an alloy including at least one thereof. These may be used alone or in combination of two or more thereof.

For example, the antenna units 110 and 210 may include silver (Ag) or a silver alloy, for example, a silver-palladium-copper (APC) alloy to implement a low resistance. In some embodiments, the antenna units 110 and 210 may include copper (Cu) or a copper alloy (e.g., a copper-calcium (CuCa) alloy) in consideration of low resistance and fine line width patterning.

In some embodiments, the antenna units 110 and 210 may include a transparent conductive oxide such as indium tin oxide (ITO), indium zinc oxide (IZO), indium zinc tin oxide (IZTO), or zinc oxide (ZnOx).

In some embodiments, the antenna units 110 and 210 may include a lamination structure of a transparent conductive oxide layer and metal layer, for example, may have a two-layer structure of transparent conductive oxide layer-metal layer or a three-layer structure of transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

Each of the antenna units 110 and 210 may include a blackening processing part, respectively. Accordingly, reflectance on surfaces of the antenna units 110 and 210 may be decreased, thereby reducing the pattern from being viewed due to light reflection.

In one embodiment, the surface of the metal layer included in the antenna units 110 and 210 may be converted into metal oxide or metal sulfide to form a blackened layer. In one embodiment, the blackened layer such as a black material coating layer or a plating layer may be formed on the antenna units 110 and 210 or the metal layer. Herein, the black material coating layer or plating layer may include silicon, carbon, copper, molybdenum, tin, chromium, nickel, cobalt, or oxide, sulfide, or an alloy containing at least one of them.

The composition and thickness of the blackened layer may be adjusted in consideration of an effect of reducing reflectance.

In some embodiments, the radiators 112 and 212 and the transmission lines 114 and 214 may include a mesh-pattern structure to improve transmittance. In this case, dummy mesh electrodes (not illustrated) may be formed around the first radiator 112 and the first transmission line 114, and around the second radiator 212 and the second transmission line 214.

The signal pads 116 and 216 and the ground pads 118 and 218 may be formed in a solid structure made of the above-described metals or alloy in consideration of a reduction in power supply resistance, noise absorption efficiency, and improvement in horizontal radiation characteristics.

In some embodiments, the radiators 112 and 212 have a mesh-pattern structure, and the transmission lines 114 and 214, the signal pads 116 and 216, and the ground pads 118 and 218 may be formed in a solid metal pattern.

In this case, the radiators 112 and 212 are disposed in a display region of the image display device, and the transmission lines 114 and 214, the signal pads 116 and 216 and the ground pads 118 and 218 may be disposed in a non-display region or a bezel region of the image display device.

In exemplary embodiments, the first circuit board 150 may include a first core layer 160 and first signal wirings 170 formed on the surface of the first core layer 160. The second circuit board 250 may include a second core layer 260 and second signal wirings 270 formed on the surface of the second core layer 260. For example, the first circuit board 150 and the second circuit board 250 may be a flexible printed circuit board (FPCB), respectively.

In some embodiments, the antenna dielectric layer 90 may be provided as the first circuit board 150. In this case, the first circuit board 150 (e.g., the first core layer 160 of the first circuit board 150) may be provided as a member substantially integral with the antenna dielectric layer 90. In addition, the first signal wiring 170 to be described below is directly connected to the first transmission line 114, such that the first signal pad 116 and the first ground pad 118 may be omitted.

In some embodiments, the antenna dielectric layer 90 may be provided as the second circuit board 250. In this case, the second circuit board 250 (e.g., the second core layer 260 of the second circuit board 250) may be provided as a member substantially integral with the antenna dielectric layer 90. In addition, the second signal wiring 270 to be described below is directly connected to the second transmission line 214, such that the second signal pad 216 and the second ground pad 218 may be omitted.

The first core layer 160 and the second core layer 260 may include, for example, a flexible resin such as a polyimide resin, modified polyimide (MPI), epoxy resin, polyester, cycloolefin polymer (COP), liquid crystal polymer (LCP) and the like. The first core layer 160 and the second core layer 260 may include internal insulation layers included in the first circuit board 150 and the second circuit board 250, respectively.

The first and second signal wirings 170 and 270 may be provided as power supply lines, for example. Specifically, the first signal wiring 170 and the second signal wiring 270 may be arranged on one surface (e.g., a surface of each of the antenna units 110 and 210 facing each other) of each of the first core layer 160 and the second core layer 260.

For example, the first circuit board 150 may further include a first coverlay film formed on the one surface of the first core layer 160 to cover the first signal wirings 170. For example, the second circuit board 250 may further include a second coverlay film formed on the one surface of the second core layer 260 to cover the second signal wirings 270.

In some embodiments, an extending direction of the first core layer 160 and the first signal wirings 170 may be formed to be perpendicular to an extending direction of the second core layer 260 and the second signal wirings 270. In this case, polarization directions of the first antenna unit 110 supplied with a power by the first signal wirings 170 and the second antenna unit 210 supplied with a power by the second signal wirings 270 may be formed to be perpendicular to each other. Accordingly, it is possible to implement dual polarization while preventing signal interference and signal loss, and reduce a fading phenomenon in which the signal amplitude and phase of the antenna unit are irregularly fluctuated.

The first signal wirings 170 and the second signal wirings 270 may be connected or bonded to the first signal pad 116 of the first antenna unit 110 and the second signal pad 216 of the second antenna unit 210, respectively. For example, the first coverlay film and second coverlay film of the first circuit board 150 and the second circuit board 250 may be partially removed to expose one end of each of the first signal wirings 170 and the second signal wirings 270. The exposed ends of the first signal wirings 170 and the second signal wirings 270 may be adhered to the first signal pad 116 and the second signal pad 216, respectively.

For example, after attaching a conductive adhesive structure such as an anisotropic conductive film (ACF) on the first signal pads 116 and the second signal pads 216, respectively, bonding regions of the first circuit board 150 and the second circuit board 250 on which the one end of each of the first antenna signal wirings 170 and the second antenna signal wirings the 270 are located may be respectively disposed on the conductive adhesive structure. Thereafter, the bonding regions of the first circuit board 150 and the second circuit board 250 may be attached to the first antenna device 100 and the second antenna device 200, respectively, through a heat treatment/pressing process, and the first signal wirings 170 and the second signal wirings 270 may be electrically connected to the first signal pad 116 and the second signal pad 216, respectively.

As illustrated in FIGS. 1 and 2, the first signal wirings 170 may be each independently connected or bonded to each of the first signal pads 116 of the first antenna unit 110. The second signal wirings 270 may be each independently connected or bonded to each of the second signal pads 216 of the second antenna unit 210. In this case, power supply and control signals may be independently supplied from a first antenna driving integrated circuit (IC) chip 310 to the first antenna unit 110 and the second antenna unit 210, respectively.

In some embodiments, a predetermined number of first antenna units 110 may be coupled with each other through the first signal wiring 170, and a predetermined number of second antenna units 210 may be coupled with each other through the second signal wiring 270.

In some embodiments, the first circuit board 150 and the second circuit board 250 may be integrally formed with the antenna dielectric layer 90. For example, the first core layer 160 and the second core layer 260 may be integrally formed with the antenna dielectric layer 90 using substantially the same member. Accordingly, a separate heating and pressing process such as bonding or attaching is unnecessary, such that signal loss and mechanical damage in the antenna devices 100 and 200 that may be caused by the heating and pressing process can be prevented.

In some embodiments, the first circuit board 150 or the first core layer 160 may include a first portion 163 and a second portion 165 having different widths, and the second portion 165 may have a reduced width compared to the first portion 163. The second circuit board 250 or the second core layer 260 may include a third portion 263 and a fourth portion 265 having different widths, and the fourth portion 265 may have a reduced width compared to the third portion 263.

The first portion 163 and the third portion 263 may be provided, for example, as main substrate portions of the first circuit board 150 and the second circuit board 250, respectively. One end of each of the first portion 163 and the third portion 263 includes a bonding region. For example, the first signal wirings 170 may extend from the bonding region toward the second portion 165 on the first portion 163. For example, the second signal wirings 270 may extend from the bonding region toward the fourth portion 265 on the third portion 263.

The first signal wirings 170 may include bent portions on the first portion 163 as indicated by dotted line circles, and the second signal wirings 270 may include bent portions on the third portion 263. Accordingly, the first signal wirings 170 may extend on the second portion 165 having a relatively narrowed width with a smaller interval or higher wiring density than in the first portion 163, and the second signal wirings 270 may extend on the fourth portion 265 having a relatively narrowed width with a smaller interval or higher wiring density than in the third portion 263.

The above-described first circuit board 150 and second circuit board 250 may be electrically connected with the third circuit board 300.

In some embodiments, the second portion 165 of the first antenna device 100 and the fourth portion 265 of the second antenna device 200 may be provided as connector connection parts. For example, the second portion 165 and the fourth portion 265 may be bent toward a rear portion of the image display device to be electrically connected with the third circuit board 300. Accordingly, circuit connection of the first signal wirings 170 and the second signal wirings 270 may be easily implemented by using the second portion 165 and the fourth portion 265 having reduced widths.

Additionally, bonding stability of the first circuit board 150 with the first antenna device 100 may be improved through the first portion 163 having an increased width, and bonding stability of the second circuit board 250 with the second antenna device 200 may be improved through the third portion 263 having an increased width. When the antenna units 110 and 210 of the antenna devices 100 and 200 are arranged in an array form, sufficient distribution space of the signal wirings 170 and 270 may be provided through the first portion 163 and the third portion 263.

According to exemplary embodiments, the first circuit board 150 and the third circuit board 300 may be electrically connected with each other through a first-third circuit board connection connector 180. The second circuit board 250 and the third circuit board 300 may be electrically connected with each other through a second-third circuit board connection connector 280.

In some embodiments, the first-third circuit board connection connector 180 and the second-third circuit board connection connector 280 are provided as board-to-board (B2B) connectors. In addition, the first-third circuit board connection connector 180 may include a first connector 183 and a third connector 185, and the second-third circuit board connection connector 280 may include a second connector 283 and a fourth connector 285.

For example, the first-third circuit board connection connector 180 may be mounted on the second portion 165 of the first circuit board 150 through a surface mount technology (SMT) so as to be electrically connected with distal ends of the first signal wirings 170. For example, the second-third circuit board connection connector 280 may be mounted on the fourth portion 265 of the second circuit board 250 through the surface mount technology (SMT) so as to be electrically connected with distal ends of the second signal wirings 270.

In exemplary embodiments, the third circuit board 300 may be a main board of the image display device, and may be a rigid printed circuit board. For example, the third circuit board 300 may include a resin (e.g., epoxy resin) layer such as a prepreg impregnated with an inorganic material such as glass fiber as a base insulation layer, and may include circuit wirings distributed on the surface of the base insulation layer and inside thereof.

In exemplary embodiments, at least one antenna driving IC chip 310 may be mounted on the third circuit board 300.

In some embodiments, one antenna driving IC chip 310 may be mounted on the third circuit board 300. In this case, a plurality of antenna units 110 and 210 may be electrically connected to one antenna driving IC chip 310. Thereby, antenna units 110 and 210 having different polarization directions may be driven with a power supplied from one antenna driving IC chip 310, and dual polarization in a high frequency or ultra-high frequency band may be stably implemented while preventing signal loss and signal interference.

In some embodiments, the antenna driving IC chip 310 may be separately disposed on the third circuit board 300, and may be electrically connected with the first circuit board 150 and the second circuit board 250.

In some embodiments, the third connector 185 may be electrically connected with the antenna driving IC chip 310 through a first connection wiring 313 included in the third circuit board 300, and the fourth connector 285 may be electrically connected with the antenna driving IC chip 310 through a second connection wiring 315 included in the third circuit board 300.

In some embodiments, the first connection wiring 313 and the second connection wiring 315 may extend in a direction perpendicular to each other in a planar direction. Accordingly, it is possible to increase the space efficiency of the antenna package and the display device to be described below while implementing the dual polarization in which signal interference is prevented.

As shown by arrows in FIG. 2, the first connector 183 mounted on the first circuit board 150 and the third connector 185 mounted on the third circuit board 300 may be coupled with each other, and the second connector 283 mounted on the second circuit board 250 and the fourth connector 285 mounted on the third circuit board 300 may be coupled with each other. For example, the first connector 183 and the second connector 283 may be provided as plug connectors, and the third connector 185 and the fourth connector 285 may be provided as receptacle connectors.

Accordingly, a connection between the first circuit board 150 and the third circuit board 300, and an electrical connection between the antenna driving IC chip 310 and the first antenna unit 110 may be implemented through the first-third circuit board connection connector 180. In addition, a connection between the second circuit board 250 and the third circuit board 300, and an electrical connection between the antenna driving IC chip 310 and the second antenna unit 210 may be implemented through the second-third circuit board connection connector 280.

Accordingly, power supply/control signals (e.g., phase, beam tilting signals, etc.) from one antenna driving IC chip 310 may be separately and independently applied to the first antenna unit 110 and the second antenna unit 210.

In addition, a relay structure to which the first circuit board 150, the first-third circuit board connection connector 180, and the third circuit board 300 are electrically connected may be formed, and a relay structure to which the second circuit board 250, the second-third circuit board connection connector 280, and the third circuit board 300 are electrically connected may be formed.

In some embodiments, as described above, the first and second circuit boards 150 and 250 and the third circuit board 300 may be electrically coupled with each other using the connectors 180 and 280. Accordingly, the first and second circuit boards 150 and 250 and the third circuit board 300 may be easily coupled with each other using the connectors 180 and 280 without an additional heating or pressing process such as an adhering process, a bonding process, etc.

Therefore, it is possible to suppress a dielectric loss due to thermal damage to the substrate and an increase in resistance due to wiring damage, which are caused in the heating and pressing process, and to suppress signal loss in the antenna units 110 and 210.

In some embodiments, the connection of the first circuit board 150 with the third circuit board 300 and the connection of the second circuit board 250 with the third circuit board 300 may be implemented through a heating and pressing process such as an adhering process and a bonding process.

In this case, for example, the antenna driving IC chip 310 and the first signal wirings 170 are electrically connected through the first connection wiring 313 disposed on the third circuit board 300, such that power supply to and driving control of the first antenna device 100 may be performed. In addition, for example, the antenna driving IC chip 310 and the second signal wirings 270 are electrically connected through the second connection wiring 315 disposed on the third circuit board 300, such that power supply to and driving control of the second antenna device 200 may be performed.

In some embodiments, a circuit element 320 and a control element 330 may be mounted on the third circuit board 300 in addition to the antenna driving IC chips 310. The circuit element 320 may include, for example, a capacitor such as a multilayer ceramic capacitor (MLCC), an inductor, a resistor or the like. The control element 330 may include, for example, a touch sensor driving IC chip, an application processor (AP) chip or the like.

Figure 3:
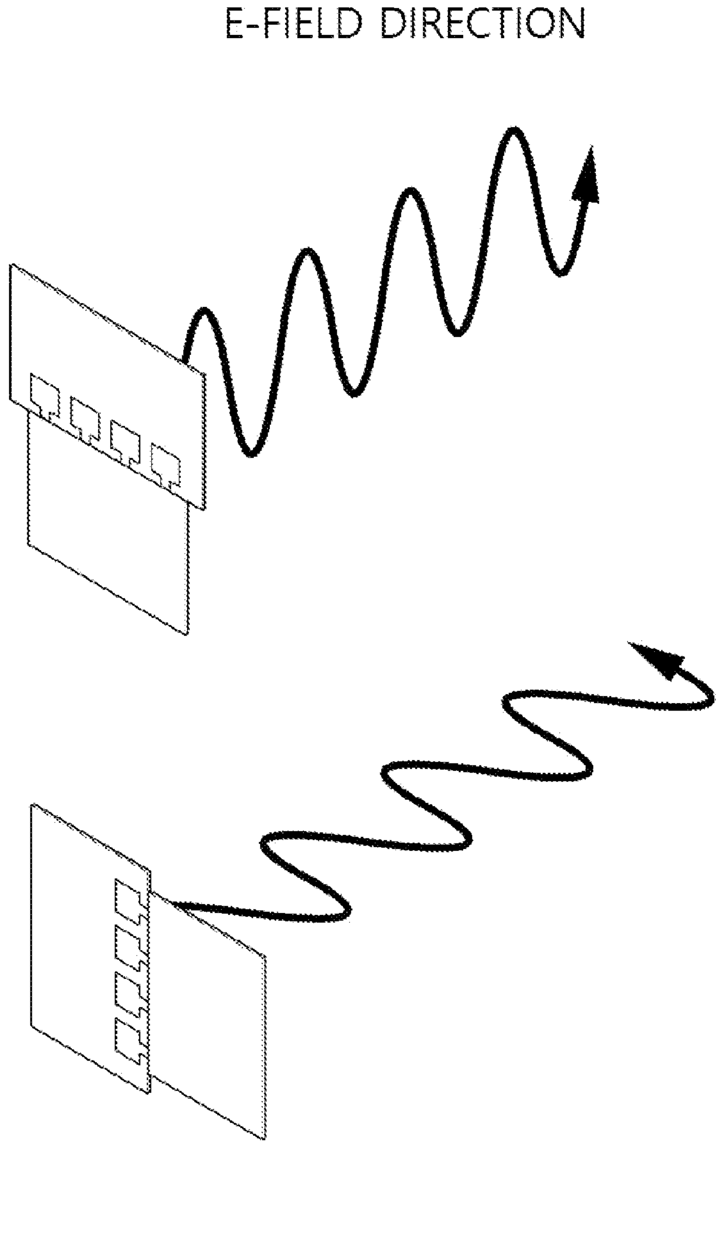
FIG. 3 is a schematic view illustrating dual polarization of an antenna package according to exemplary embodiments.

FIG. 3 is a schematic view illustrating dual polarization of an antenna package according to exemplary embodiments.

Specifically, FIG. 3 may be a schematic view of dual polarization of two antenna devices disposed to have polarization directions perpendicular to each other. The polarization direction may mean, for example, a vibration direction when traveling waves, and in FIG. 3, an E-field direction may mean a direction in which an electric field is formed.

Referring to FIG. 3, the first antenna device 100 and the second antenna device 200 may be disposed similarly to the two antenna devices of FIG. 3, and in this case, dual polarization may be implemented.

Figure 4:
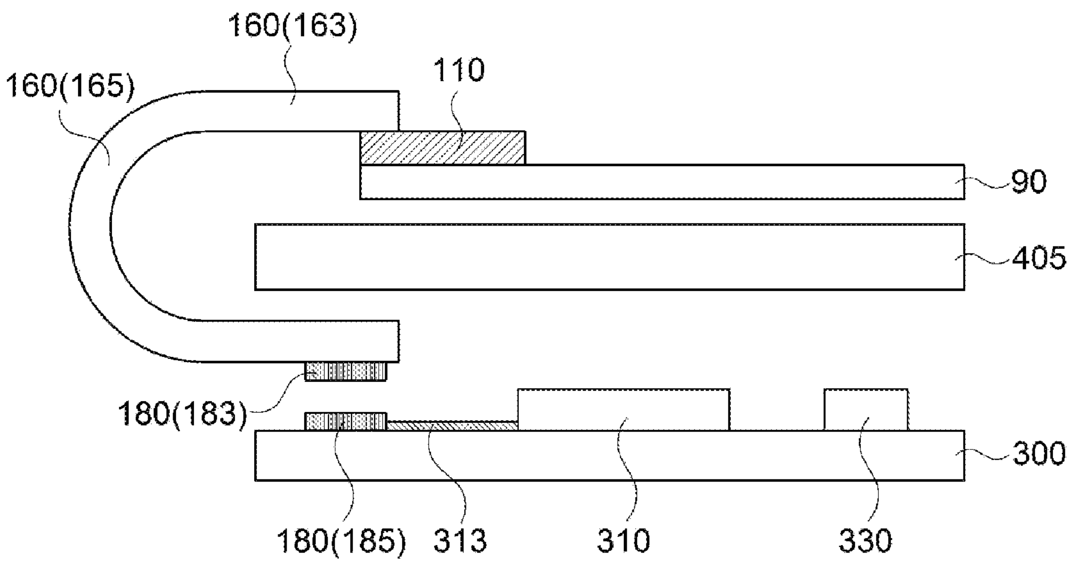
FIG. 4 is a schematic cross-sectional view illustrating an antenna package according to exemplary embodiments.

FIG. 4 is a schematic cross-sectional view illustrating an antenna package according to exemplary embodiments.

Referring to FIG. 4, the first antenna device 100 and the second antenna device 200 according to some embodiments may be disposed on a top surface of a display panel 405 of an image display device to be described below. In FIG. 4, the second antenna device 200, the second circuit board 250, and the second-third circuit board connection connector 280 will not be illustrated for the convenience of description.

In some embodiments, the first antenna unit 110 of the first antenna device 100 and the second antenna unit 210 of the second antenna device 200 may be separately disposed on the top surface of the display panel 405.

In some embodiments, the first circuit board 150 electrically connected with the first antenna device 100 and the second circuit board 250 electrically connected with the second antenna device 200 may extend by bending from the top surface of the display panel 405 along a side surface and a bottom surface thereof, respectively.

In this case, in some embodiments, the first connector 183 may be fastened to the third connector 185 mounted on the third circuit board 300 by bending the second portion 165 having a relatively narrowed width of the first circuit board 150, and the second connector 283 may be fastened to the fourth connector 285 mounted on the third circuit board 300 by bending the fourth portion 265 having a relatively narrowed width of the second circuit board 250. Accordingly, electrical connection between the third circuit board 300 disposed below the display panel 405 and the first and second circuit boards 150 and 250 may be easily implemented.

Figure 5:
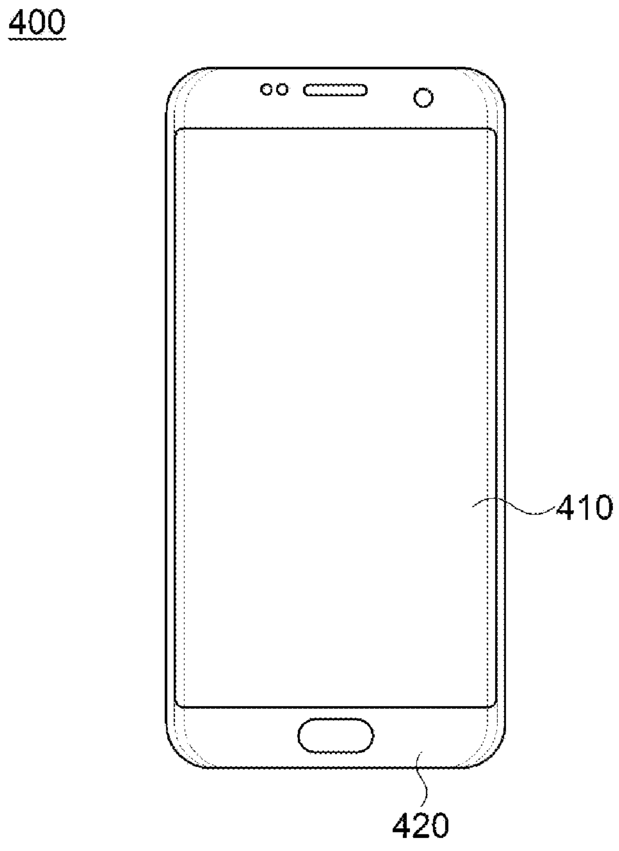
FIG. 5 is a plan view illustrating an image display device according to exemplary embodiments.

FIG. 5 is a plan view illustrating an image display device according to exemplary embodiments.

Referring to FIG. 5, an image display device 400 may be implemented in a form of, for example, a smart phone. FIG. 4 shows the front portion or window surface of the image display device 400. The front portion of the image display device 400 may include a display region 410 and a peripheral region 420. The peripheral region 420 may correspond to a light-shielding part or a bezel part of the image display device, for example.

Figure 6:
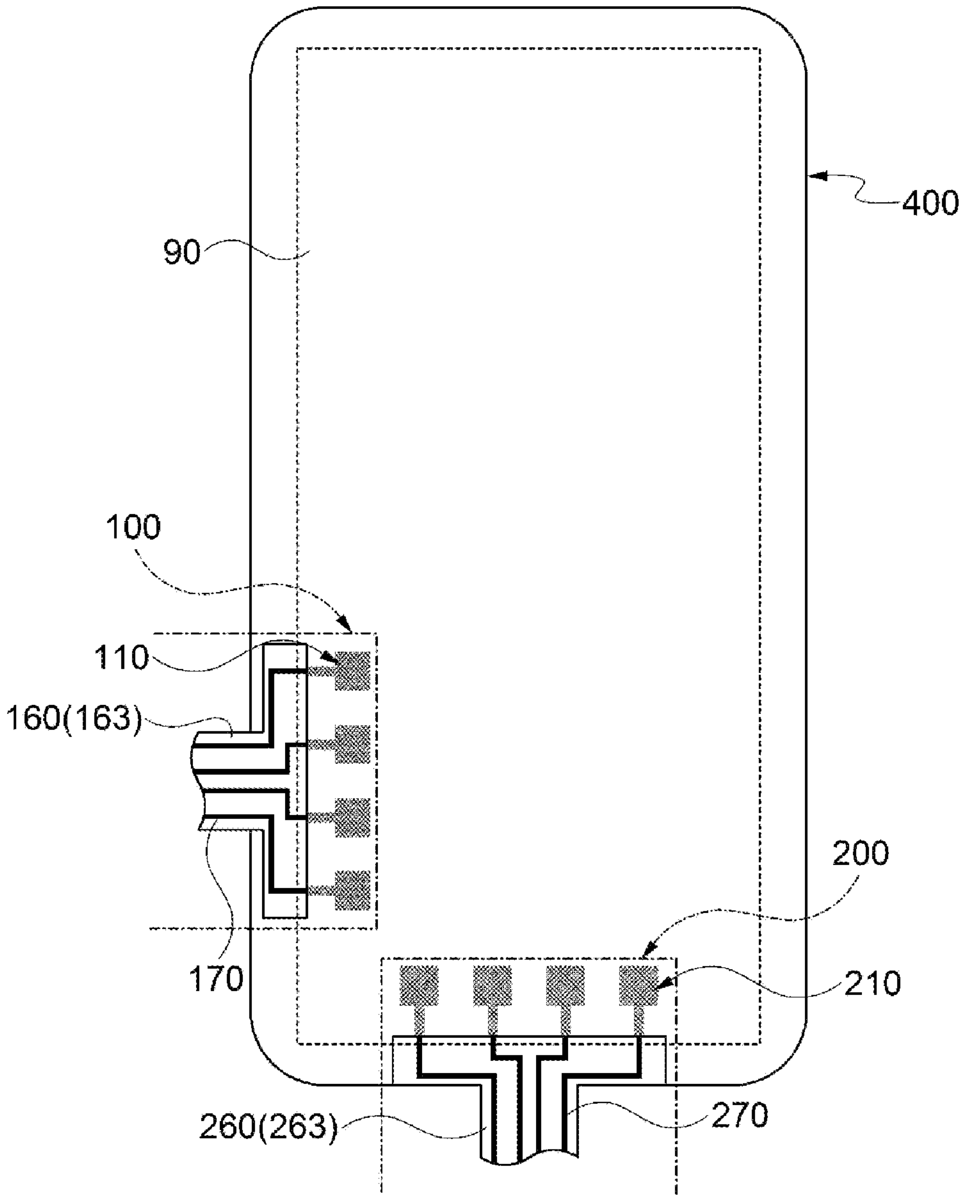
FIGS. 6 and 7 are schematic plan views of an antenna package and an image display device including the same according to exemplary embodiments.
Figure 7:
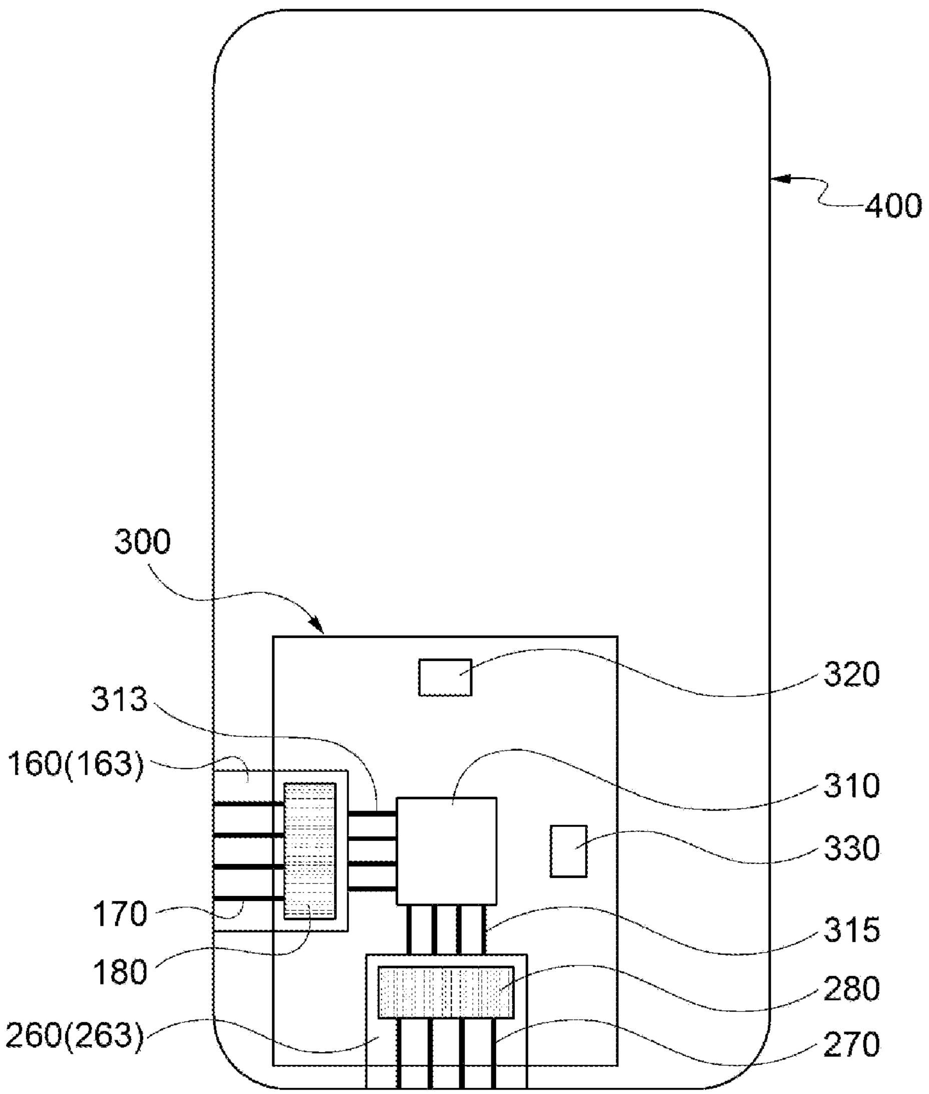

FIGS. 6 and 7 are schematic plan views of the antenna package and an image display device including the same according to exemplary embodiments. FIGS. 6 and 7 may be plan views illustrating by enlarging components included in the antenna package than the size actually occupied in the image display device for the convenience of description.

Referring to FIGS. 6 and 7, the first antenna device 100 and the second antenna device 200 included in the above-described antenna package may be disposed toward the front portion of the image display device 400, and for example, may be disposed on the top surface of the display panel 405. In some embodiments, the first radiator 112 and the second radiator 212 may be partially or entirely overlapped with the display region 410.

In this case, the first radiator 112 and the second radiator 212 may include a mesh-pattern structure, and a decrease in transmittance due to the first radiator 112 and the second radiator 212 may be prevented. The signal pads 116 and 216 and the ground pads 118 and 218 included in the first antenna unit 110 and the second antenna unit 210 are formed in a solid metal pattern, and may be disposed in the peripheral region 420 to prevent a deterioration in image quality.

In some embodiments, the first circuit board 150 may be, for example, disposed on the rear portion of the image display device 400 by bending through the second portion 165, and may extend toward the third circuit board 300 (e.g., a main board) on which the antenna driving IC chip 310 is mounted.

In some embodiments, the second circuit board 250 may be, for example, disposed on the rear portion of the image display device 400 by bending from a side portion of the image display device 400 through the fourth portion 265, or extending from the back portion of the image display device 400, and may extend toward the third circuit board 300 (e.g., the main board) on which the antenna driving IC chip 310 is mounted.

In some embodiments, the first circuit board 150 and the third circuit board 300 are connected with each other through the first-third circuit board connection connector 180, such that power supply to and driving control of the first antenna device 100 through the antenna driving IC chip 310 may be implemented.

In some embodiments, the second circuit board 250 and the third circuit board 300 are connected with each other through the second-third circuit board connection connector 280, such that power supply to and driving control of the second antenna device 200 through the antenna driving IC chip 310 may be implemented.

In some embodiments, the first antenna unit 110 and the second antenna unit 210 may be disposed adjacent to each other with one of corner portions of the top surface of the display panel 405 of the image display device 400 interposed between the first antenna unit 110 and the second antenna unit 210.

For example, the first antenna unit 110 may be disposed along a lengthwise edge of the display panel 405 adjacent to the corner portion, and the second antenna unit 210 may be disposed along a widthwise edge of the display panel 405 adjacent to the corner portion.

Accordingly, the radiators 112 and 212 may have polarization directions perpendicular to each other. In addition, by decreasing a total length of the first and second circuit boards 150 and 250 and the signal wirings 170 and 270, signal loss may be suppressed, and thus signal efficiency of the antenna device may be improved. In addition, a region occupied by the antenna devices 100 and 200 in the image display device 400 may be decreased, and thereby space efficiency of the image display device 400 may be increased.

As described above, two antenna devices of one antenna package may be disposed to have polarization directions perpendicular to each other by separating the space, and thereby realizing an antenna package that minimizes signal interference and signal loss while implementing dual polarization and multiaxial radiation in a high frequency or ultra-high frequency band.

What is claimed is:

1. An antenna package comprising:

a first antenna device including a first antenna unit including a first radiator;

a second antenna device including a second antenna unit including a second radiator having a polarization direction perpendicular to the first radiator;

a first circuit board electrically connected with the first antenna unit;

a second circuit board electrically connected with the second antenna unit;

a third circuit board on which at least one antenna driving integrated circuit (IC) chip electrically and independently connected to the first circuit board and the second circuit board is mounted;

a first connector disposed on the first circuit board to be electrically connected with the first antenna unit;

a second connector disposed on the second circuit board to be electrically connected with the second antenna unit;

a third connector disposed on the third circuit board and coupled to the first connector to electrically connect the first antenna unit and the antenna driving IC chip to each other; and a fourth connector disposed on the third circuit board and coupled to the second connector to electrically connect the second antenna unit and the antenna driving IC chip to each other.

2. The antenna package according to claim 1, wherein the first antenna device and the second antenna device are located at the same level.

3. The antenna package according to claim 2, wherein the first antenna unit comprises a plurality of the first antenna units arranged in a column direction; and the second antenna unit comprises a plurality of the second antenna units arranged in a row direction perpendicular to the column direction in a planar direction.

4. The antenna package according to claim 3, wherein one antenna driving IC chip is disposed on the third circuit board.

5. The antenna package according to claim 4, wherein the third circuit board comprises a first connection wiring electrically connecting the first antenna unit and the antenna driving IC chip, and a second connection wiring electrically connecting the second antenna unit and the antenna driving IC chip.

6. The antenna package according to claim 5, wherein the first connection wiring and the second connection wiring extend in a direction perpendicular to each other in a planar direction.

7. The antenna package according to claim 1, wherein the first circuit board and the second circuit board are a flexible printed circuit board (FPCB), respectively, and the third circuit board is a rigid printed circuit board.

8. The antenna package according to claim 1, wherein the first antenna unit and the second antenna unit are independently and separately disposed on one antenna dielectric layer.

9. The antenna package according to claim 8, wherein the first circuit board and the second circuit board are integrally formed with the antenna dielectric layer.

10. The antenna package according to claim 1, further comprising a circuit element or a control element mounted on the third circuit board.

11. An image display device comprising:

a display panel; and the antenna package according to claim 1 coupled to the display panel.

12. The image display device according to claim 11, wherein the first antenna unit and the second antenna unit are independently and separately disposed on a top surface of the display panel.

13. The image display device according to claim 12, wherein the first antenna unit and the second antenna unit are disposed adjacent to each other with one of corner portions of the top surface of the display panel interposed between the first antenna unit and the second antenna unit.

14. The image display device according to claim 13, wherein the first antenna unit is disposed along a lengthwise edge of the display panel adjacent to the corner portion, and the second antenna unit is disposed along a widthwise edge of the display panel adjacent to the corner portion.

15. An image display device comprising:

a display panel; and an antenna package coupled to the display panel, the antenna package comprising:

a first antenna device including a first antenna unit including a first radiator;

a second antenna device including a second antenna unit including a second radiator having a polarization direction perpendicular to the first radiator;

a first circuit board electrically connected with the first antenna unit;

a second circuit board electrically connected with the second antenna unit;

a third circuit board on which at least one antenna driving integrated circuit (IC) chip electrically and independently connected to the first circuit board and the second circuit board is mounted wherein the third circuit board is disposed below the display panel, and the first circuit board and the second circuit board each extend by bending from the top surface of the display panel along a side surface and a bottom surface of the display panel to be electrically connected with the third circuit board.

* * * * *